US012587856B2

(12) United States Patent (10) Patent No.: US 12,587,856 B2
Aydin et al. (45) Date of Patent: Mar. 24, 2026

(54) MOBILE DEVICE, METHOD FOR OPERATING A MOBILE DEVICE, AND VEHICLE

(71) Applicant: MERCEDES-BENZ GROUP AG, Stuttgart (DE)

(72) Inventors: Osman Aydin, Leinfelden-Echterdingen (DE); Viktor Pavlovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 168 days.

(21) Appl. No.: 18/578,840

(22) PCT Filed: Jun. 30, 2022

(86) PCT No.: PCT/EP2022/068013
§ 371 (c)(1),
(2) Date: Jan. 12, 2024

(87) PCT Pub. No.: WO2023/285150
PCT Pub. Date: Jan. 19, 2023

(65) Prior Publication Data
US 2024/0323693 A1 Sep. 26, 2024

(30) Foreign Application Priority Data
Jul. 13, 2021 (DE) .................... 10 2021 003 596.8

(51) Int. Cl.
*H04W 12/121* (2021.01)

(52) U.S. Cl.
CPC ................................ *H04W 12/121* (2021.01)

(58) Field of Classification Search
CPC ............. H04L 63/1416; H04L 63/1441; H04L 63/1433; G06F 21/55
See application file for complete search history.

(56) References Cited

U.S. PATENT DOCUMENTS 9,801,045 B2* 10/2017 Ho ...................... H04L 63/0876
9,807,613 B2* 10/2017 Egner ................... H04W 4/027
(Continued)

FOREIGN PATENT DOCUMENTS

DE      102016114321 A1   2/2017
DE      102017128063 A1   5/2019
WO      2014105309 A1     7/2014

OTHER PUBLICATIONS

Office Action dated Jun. 16, 2025 in related/corresponding EP Application No. 22744400.7.
(Continued)

*Primary Examiner* — Hosuk Song
(74) *Attorney, Agent, or Firm* — PATENT PORTFOLIO BUIDLERS PLLC

(57) ABSTRACT
A mobile device includes an operating system and at least two SIM profiles for providing several independent mobile connections. Network traffic is exchanged via at least one mobile connection with a mobile network and information transmitted with the network traffic is identified. The mobile device includes an intrusion detection system or an intrusion detection and defense system configured to identify at least the information transmitted with the network traffic. The intrusion detection system or the intrusion detection and defense system is arranged in a direction of the information flow of network traffic received from at least one mobile connection upstream of the operating system.

16 Claims, 1 Drawing Sheet

(56)         References Cited

U.S. PATENT DOCUMENTS

Figure 1:
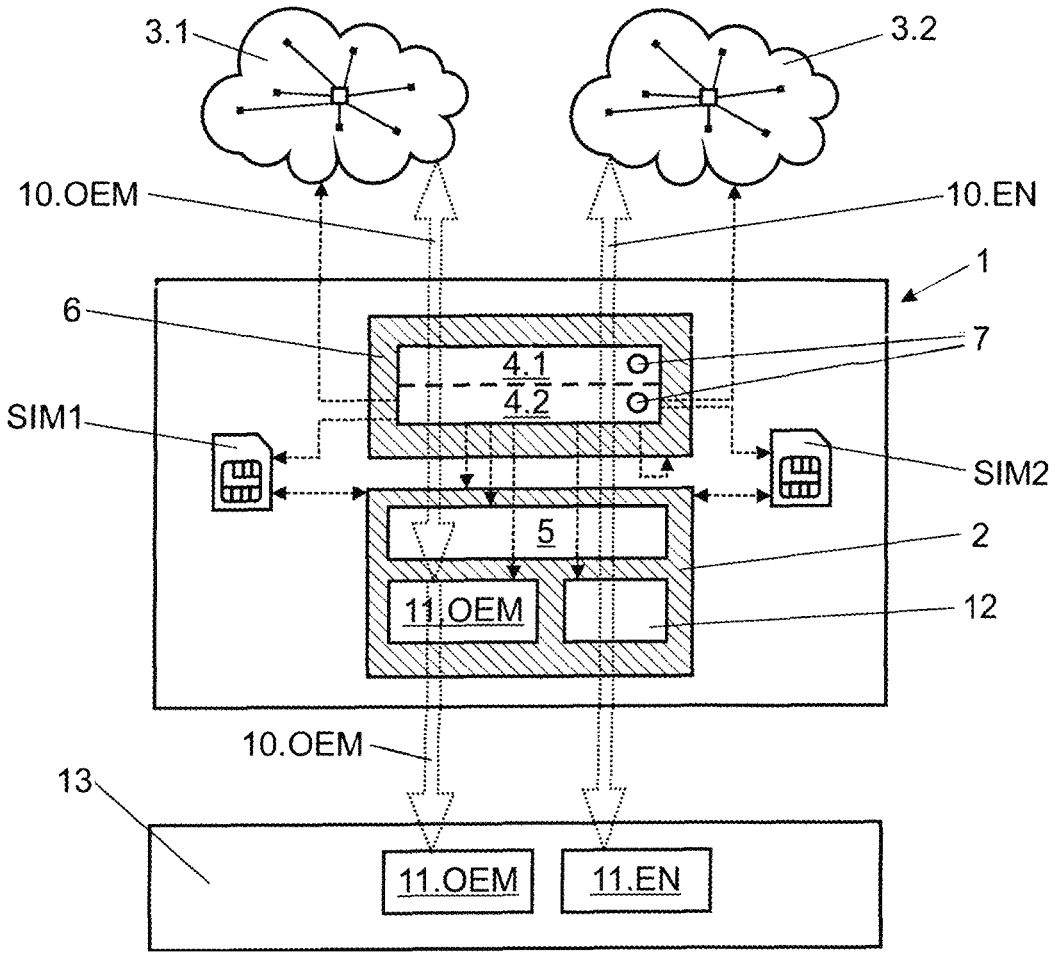

| | | | | |
|---|---|---|---|---|
| 9,894,601 | B2 | 2/2018 | Murray et al. | |
| 10,735,944 | B2 * | 8/2020 | Syed | H04L 67/1014 |
| 11,082,855 | B2 * | 8/2021 | Khan | H04W 12/069 |
| 11,356,841 | B2 * | 6/2022 | Lee | H04L 63/0823 |
| 11,711,691 | B2 * | 7/2023 | Gundavelli | H04L 63/104 |
| | | | | 370/329 |
| 11,785,662 | B2 * | 10/2023 | Prakash | H04L 67/145 |
| | | | | 455/414.1 |
| 12,225,503 | B2 * | 2/2025 | Esswie | H04W 68/02 |
| 2014/0004829 | A1 | 1/2014 | Rieger et al. | |
| 2015/0271138 | A1 | 9/2015 | Lukin et al. | |
| 2016/0269891 | A1 * | 9/2016 | Chen | H04W 76/18 |
| 2020/0274851 | A1 | 8/2020 | Qiao et al. | |

OTHER PUBLICATIONS

Office Action dated Jun. 16, 2025 in related/corresponding KR Application No. 10-2023-7045514.
Office Action dated Dec. 3, 2024 in related/corresponding JP Application No. 2024501547.
HT Auto Desk; "This SUV has dual sim connectivity, just like your smartphone;" Jan. 14, 2020; https://auto.hindustantimes.com/auto/cars/this-suv-has-dual-simconnectivity-just-like-your-smartphone-41578976136569.html.
International Search Report and Written Opinion mailed Oct. 27, 2022 in related/corresponding International Application No. PCT/EP2022/068013.
Office Action created Mar. 25, 2022 in related/corresponding DE Application No. 10 2021 003 596.8.

* cited by examiner 3.1

3.2

10.OEM

10.EN

1

6

7

4.1

4.2

SIM1

SIM2

5

2

11.OEM

12

10.OEM

13

11.OEM

11.EN

8

13

9

MOBILE DEVICE, METHOD FOR OPERATING A MOBILE DEVICE, AND VEHICLE

BACKGROUND AND SUMMARY OF THE INVENTION

Exemplary embodiments of the invention relate to a mobile device with an operating system and at least two SIM profiles for providing several independent mobile phone connections, as well as to a method for operating such a mobile device and to a vehicle with a mobile device.

IT systems, such as computers, mobile terminals, high-performance computers, distributed systems, database systems, embedded systems, measuring systems or similar, typically have various interfaces for interacting. Thus, an interaction with people can be carried out, for example via a human-machine-interface, as well as between IT systems themselves, wherein communication protocols such as, for example, the internet protocol (IP) or the transmission control protocol (TCP) are used. Attackers are able to attack IT systems via such interfaces. Such attacks typically aim to influence the normal operation of IT systems, to gain unauthorized access, to destroy or to shut-down IT systems, to steal or manipulate critical information, or similar. Frequently, IT systems are infected or attacked with malware. Malware can, for example, be viruses, spyware, adware, botnets, or similar. An IT system operator is typically interested in protecting the IT system it operates as reliably as possible against such attacks.

Increasingly, mobile devices are integrated in vehicles in order to enable a data exchange, for example for transmitting diagnosis data with a vehicle manufacturer. Such mobile devices can also be equipped with a plurality of SIM profiles, for example in the form of a plurality of SIM cards and/or a plurality of SIM signatures stored encoded on a storage device. The provision of additional SIM profiles enables the integration of customer or third-party SIM profiles which, in contrast to a completely trusted manufacturer SIM profile, can be used comparatively easily to compromise the mobile device. For example, malicious data packets can be smuggled into the mobile device via a mobile network operated by an attacker, such as a mobile network operated via a manipulated femtocell, and used to execute malware on the mobile device or another computing unit in the vehicle.

From the general prior art, different hardware and/or software solutions for protecting IT systems are generally known. These include, for example, firewalls, antivirus programs, intrusion detection systems (IDS), as well as intrusion detection and defense systems, also referred to as intrusion prevention system (IPS). Intrusion detection systems or intrusion detection and defense systems serve to detect and/or defend against attacks targeted at computer systems and/or computer networks. Such a system is typically executed on the hardware to be monitored and/or is directly integrated into a firewall. Along with host-based intrusion detection systems and network-based intrusion detection systems, hybrid systems are also known. For detecting an attack, data and/or network traffic monitored by the intrusion detection system or the intrusion detection and defense system is analyzed for known attack patterns. A corresponding system accordingly comprises a pattern database with known attack patterns. If such an attack pattern is detected, the corresponding intrusion detection system hits the alarm. With the aid of heuristic methods, as well as statistical analysis, previously unknown attacks can also be detected. An intrusion detection and defense system is additionally able to discard data packets, to interrupt a communication connection and/or to change transmitted data.

A system and method for the correlation of network information with participant information in a mobile network environment is known from WO 2014/105309 A1. Data packets received from a network like the internet, an intranet, a VPN or similar are investigated by a network security platform with the aid of deep packet inspection. With the aid of the network security platform and the deep packet inspection, operators of wireless networks are able to create behavior profiles of participants of the mobile network and to connect specific network events such as accessing specific websites, executing specific applications, receiving and/or transmitting specific data or similar with specific network participants. Targeted attacks from or by the participants of the mobile network can thus be prevented. For example, downloading malware can be detected and prevented or a communication between a network participant with a security-critical website can be detected or blocked. The network security platform is operated by the operator of the mobile network environment, whereby the individual participants of the mobile network environment do not have any influence on the user behavior profiles assigned to the individual participants. In other words, the operator of the mobile network environment is able to monitor and control the participants.

Exemplary embodiments of the present invention are directed to a mobile device with an operating system and at least two SIM profiles for providing a plurality of independent mobile connections, which can be operated particularly securely.

A mobile device with an operating system and at least two SIM profiles for providing a plurality of independent mobile connections is provided according to the invention with an intrusion detection system or an intrusion detection and defense system configured to identify at least the information transmitted with the network traffic, wherein the intrusion detection system or the intrusion detection and defense system is arranged in a direction of the information flow of network traffic received from at least one mobile connection upstream of the operating system.

Due to an intrusion detection system or intrusion detection and defense system, arranged upstream of the operating system in the direction of information flow, the mobile device can be operated particularly securely. Thus, attacks are able to be recognized particularly early with the intrusion detection system or the intrusion detection and defense system due to their provision upstream of the operating system in the direction of information flow. Appropriate reactions to an attack are likewise possible early. The mobile device can therefore also be protected in the case of attacks on network interfaces, interface drivers, and the IP stacks of the operating system. Typically, intrusion detection systems or intrusion detection and defense systems are integrated into a firewall or into an operating system. Such integrated intrusion detection or defense however, has reduced capabilities for monitoring and filtering incoming data packets. In addition, the host operating system must process the data packets to be analyzed, so that the intrusion detection or defense system can detect attacks, whereby the operating system itself is exposed to possible attacks. However, if the data packets comprised in the network traffic are investigated in the direction of information flow upstream of the operating system, the operating system can also not be attacked.

With the aid of an intrusion detection system, in the case of a detected attack, warnings can be output. On the other hand, with the aid of an intrusion detection and defense system however, adequate measures for containing or preventing the attack can also be initiated directly by the mobile device itself.

The mobile device has at least two mobile connections. Using the intrusion detection system or the intrusion detection and defense system, attacks can be detected selectively on the individual mobile connections. This allows a specific reaction to an attack carried out via a respective mobile connection. Thus, a security attack on a first mobile connection can be reacted to differently than a security attack on a second mobile connection. Furthermore, in the event of an attack via a first mobile radio connection, secure operation of the mobile device can be ensured via at least one second mobile radio connection. Due to the early detection and reaction to security attacks it is possible to reduce or prevent a manipulation of the mobile device and/or to prevent a shutdown of the mobile device on security grounds.

For communication, generally any radio technology such as mobile radio, Wi-Fi or similar can be used by the mobile device. Any mobile radio or communication standard, such as 2G-5G, or also future communication standards can be used for this. For example, WLAN telephony can be provided via at least one mobile connection. A corresponding radio network can be provided by a stationary base station, for example a mobile phone mast or a femtocell, and/or a mobile station such as a satellite, a drone, a balloon, or similar.

An advantageous further development of the mobile device provides that a firewall is arranged downstream of the intrusion detection system or the intrusion detection and defense system in the direction of information flow of the network traffic. Due to the provision of a firewall, the mobile device can be operated even more securely. As the firewall is downstream of the intrusion detection system or intrusion detection and defense system and the corresponding systems are not integrated into the firewall, a functionality of the intrusion detection system or the intrusion detection and defense system can be comprehensively carried out. Thus, even more secure protection of the mobile device is possible.

According to a further advantageous embodiment of the mobile device, the intrusion detection system or the intrusion detection and defense system is configured to monitor, control and/or filter the network traffic. Due to the monitoring of the network traffic, dangerous data packets can be detected as well as attack patterns. Thus, individual data packets or individual building blocks of the network traffic can be investigated in detail in a targeted manner, i.e., controlled. For example, individual code sections can be executed in a secure environment such as a virtual machine and can be investigated for their impact. Similarly, individual network traffic building blocks or data packets can also be prevented from being transferred to the operating system or the firewall, i.e., the network traffic is filtered. For example, the transfer of dangerous data packets to the operating system and/or computing units downstream of the mobile device in the direction of information flow can be prevented and/or denial of service (DOS) attacks can be recognized and prevented.

A further advantageous embodiment of the mobile device further provides that the intrusion detection system or the intrusion detection and defense system is integrated into a modem. With the aid of a modem, the mobile device creates communication with a mobile network. Due to the integration of the intrusion detection system or the intrusion detection and defense system into the modem, the network traffic in the mobile device can be investigated and/or influenced particularly early. As a result, the mobile device is more reliably protected from attacks. For the provision of the intrusion detection system and the intrusion detection and defense system in the modem, the corresponding system can be integrated by software alone, i.e., as a software module, into the modem. It is also conceivable that the modem has additional hardware such as storage devices and/or execution device such as processors that are assigned only to the functionality of the intrusion detection system or the intrusion detection and defense system. Furthermore, it is also generally possible that a corresponding intrusion detection system or intrusion detection and defense system is positioned downstream of the modem in the direction of information flow.

According to a further advantageous embodiment of the mobile device, a deep packet inspection module is integrated into the intrusion detection system or intrusion detection and defense system. Deep packet inspection allows, along with the checking of a header part of a data packet, the content to also be checked. As a result, it is possible to analyze network traffic even more comprehensively and therefore securely. In addition, data streams can be regulated with the aid of deep packet inspection. Due to the provision of additional security certificates, encrypted data streams can also be broken open and analyzed if necessary.

Preferably, the mobile device is executed as a mobile terminal or telecommunication module of a vehicle. Mobile terminals such as smartphones, tablets, laptops or similar are widely used today. Such terminals can be operated more securely by an embodiment of such a mobile terminal according to the mobile device according to the invention. Particularly many users can be protected as a result of the high dissemination. With advancing digitalization, vehicles are increasingly being networked. With the aid of a telecommunication module, vehicles, for example, can transmit diagnosis parameters for research and development purposes to the vehicle manufacturer, can receive data for comfort services such as traffic data, a weather report or similar, or also receive firmware or software updates for control devices. By implementing such a telecommunication module in accordance with the mobile device according to the invention, such vehicles can be protected even more reliably against attacks.

This is in particular significant for automated or autonomously controlled vehicles such as for example autonomous lorries. Such autonomous vehicles for example can receive control orders from a vehicle control center. It is thus conceivable that an attack on the telecommunication module of such a vehicle could be used to send manipulated control orders to the vehicle so that it is involved in an accident or steered to a different destination, for example to steal a load from the autonomous lorry. However, by an embodiment of the telecommunication module as a mobile device according to the invention, the probability of a successful execution of such an attack is minimized.

For communication with the vehicle manufacturer, such a telecommunication module has a SIM profile assigned to the vehicle manufacturer. Typically, the vehicle manufacturer agrees conditions with a mobile network operator such as one-time or regular costs, a data bandwidth, a maximum permitted amount of data sent or received per time unit or similar. The buyer of a vehicle having a telecommunication module with at least two SIM profiles has the option of providing a private SIM profile in the telecommunication unit. This enables mobile usage independent from the conditions negotiated by the vehicle manufacturer with the telecommunications company. The provision of a private customer SIM profile allows, however, the implementation of manipulated SIM profiles in the telecommunication unit. However, as the mobile device according to the invention is able to monitor and control a plurality of mobile connections independently from each other, network traffic taking place via the SIM profile of the customer can be controlled particularly strictly and managed, whereas the network traffic running via the SIM profile of the vehicle manufacturer can carry on undisturbed.

In a method for operating a mobile device described above, after detecting a security threat for the mobile device, its operating system is reconfigured in order to adapt system behavior to the security threat and/or a functionality of at least one hardware and/or software component downstream of the mobile device in the direction of information flow is restricted.

Due to the reconfiguration of the operating system, despite a detected security threat, operation of the mobile device can be maintained. In particular, when an attack takes place via a first mobile connection, the network traffic can continue via at least one second mobile connection. In an attack scenario, corresponding measures to be carried out by the intrusion detection system or intrusion detection and defense system can be saved in a measures database of the intrusion detection system or intrusion detection and defense system. It is also possible that, with an attack on a first mobile connection, new instructions for an adequate reaction to the attack are received by the mobile device via at least one second mobile connection. Security vulnerabilities can be eliminated by the mobile connection, which was excluded from the attack, and new, previously unknown threats can be reacted to quickly. Furthermore, to select a suitable reaction to an attack, a coordination can take place with a central computing unit, for example a backend of a vehicle manufacturer.

Along with the reconfiguration of the operating system, the operation of hardware and/or software components positioned downstream can also be changed. A hardware component downstream of the mobile device can be a computing unit of a vehicle. For example, this can be a central on-board computer, a control unit of a vehicle subsystem, a telematics unit, or similar. The software components can be software executed on such a corresponding computing unit, such as for example a navigation app, a radio app, a program for valve control, a program for adapting any regulator behavior, or similar. Therefore, even more comprehensive measures for adequate reactions to potential attacks are created.

A further advantageous embodiment of the method provides that the system behavior is adapted in such a way that the mobile device logs events and/or information, at least one functionality provided by the mobile device is restricted or deactivated and/or a selected path for transferring the network traffic is changed. Due to the tracking or logging of events and information, attacks can be reconstructed or detected from the logged data. Functionality provided and restricted by the mobile device can include carrying out an emergency call, an eCall, making phone calls, receiving or transmitting SMS, and/or transmitting and/or receiving digital data via mobile communication. One restriction can, for example, be that only a specific number of communication partners can be reached by phone call and/or SMS. A deactivated functionality, in contrast, would be that making a phone call and/or sending an SMS is no longer possible. It is also conceivable to test data packets received via a mobile connection in a secure test environment, for example a virtual machine, for correct functionality or content, before the corresponding network traffic is transferred to the hardware and/or software components downstream of the mobile device.

The instructions issued to the mobile device by the intrusion detection system or the intrusion detection and defense system for reconfiguration of its operating system can be implemented in a variety of ways. For example, targeted measures can be taken in order to manipulate the network traffic on one of the seven OSI layers. The mobile device can manipulate the application layer in a targeted manner. The network traffic can also be influenced on an OSI layer, upstream of the application layer. For this purpose, a corresponding exchange with a mobile network operator takes place. For example, if the mobile network operator detects manipulated network traffic via a mobile connection of the mobile device that is not affected by an attack, it can transmit instructions to the mobile device to reconfigure the operating system or to restrict or deactivate specific functionalities.

According to a further advantageous embodiment of the method according to the invention, after detecting a security threat for the mobile device, a functionality of at least one mobile connection is restricted. If an attack takes place via a first mobile connection, the mobile functionalities, e.g., sending and/or receiving specific data packets, required for the attack can be restricted or prevented. Mobile communications via at least one other mobile connection can, however, continue undisturbed. If, for example, an attack takes place via a manipulated SIM profile, the mobile communication can continue undisturbed via the SIM profile of the vehicle manufacturer. This ensures that diagnosis data can continue to be sent to the vehicle manufacturer and/or for example control orders can be received by the vehicle. Furthermore, for example, at least one of the functionalities eCall, phone call, SMS, data exchange, or similar can be restricted via a first mobile connection, for example the customer connection, and these functionalities can continue via a second mobile connection, for example the manufacturer connection.

Preferably, network traffic exchanged via a first mobile connection is adjusted when the mobile device receives a trigger, in particular a trigger received via a second mobile connection. Due to the adjustment of network traffic, in the case of an attack, the mobile device can be particularly reliably protected from the attack. Since the mobile device has a plurality of mobile connections, a corresponding trigger for the adjustment of the network traffic can also be received if a functionality of at least one mobile connection is restricted or deactivated, and even via a still open mobile connection. For example, the network traffic can be adjusted via the SIM profile of a customer and the network traffic can continue via the SIM profile of the vehicle manufacturer. The trigger can then be sent from the vehicle manufacturer, a service provider, a mobile network operator, or similar to the mobile device. If, for example, an attack on the mobile device is detected by the intrusion detection system, this information can be shared with an authorized institution, such as a vehicle manufacturer, an IT security company, the mobile network operator, or similar via the mobile connection which is not affected by an attack, after which the corresponding party analyses the alleged attack. If an attack is mistakenly detected, also referred to as a false-positive, the network traffic can continue via the mobile connection, which is allegedly attacked. If on the other hand it is actually an attack, the trigger for switching off the network traffic can be sent via the mobile connection that is being attacked via the corresponding mobile connection that is not being attacked.

According to the invention, a vehicle comprises an above-described telecommunication module. The vehicle can be any vehicle such as a car, lorry, van, bus or similar. The vehicle can have a combustion engine and/or an electric engine. The vehicle can additionally be controlled manually, at least partially automatically or also autonomously. With the aid of a telecommunication module according to the invention, a corresponding vehicle according to the invention can be particularly securely operated.

Further advantageous embodiments of the mobile device according to the invention and the vehicle result from the embodiments which are described in more detail below with reference to the figures.

BRIEF DESCRIPTION OF THE DRAWING FIGURES

Figure 2:
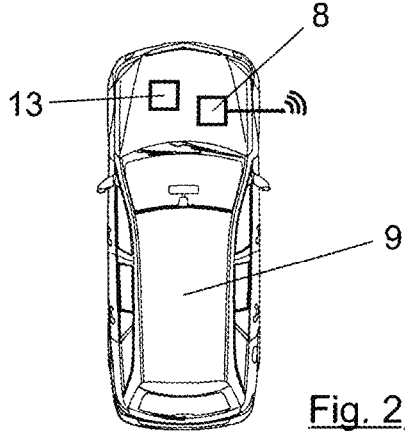

Shown here:

FIG. 1 a schematic representation of mobile device according to the invention; and FIG. 2 a schematic representation of a vehicle according to the invention with a mobile device according to the invention in the form of a telecommunication module.

DETAILED DESCRIPTIONS

FIG. 1 shows a mobile device 1 according to the invention with several mobile connections, which are each assigned a separate SIM profile SIM1, SIM2. With the aid of the mobile connections, the mobile device 1 is able to communicate with several mobile networks 3.1, 3.2. Thus, network traffic exchanged between the mobile device 1 and the mobile network(s) 3.1, 3.2 runs via an OEM data path 10.OEM as well as an end user data path 10.EN.

A modem 6 comprised in the mobile device 1 receives the network traffic. The modem 6 in turn comprises an intrusion detection system 4.1 or an intrusion detection and defense system 4.2. The corresponding intrusion detection system 4.1 or intrusion detection and defense system 4.2 identifies the information transmitted with the network traffic. The intrusion detection system 4.1 or the intrusion detection and defense system 4.2 can additionally comprise a deep packet inspection module 7, in order to investigate the network traffic by means of deep packet inspection. The intrusion detection system 4.1 or the intrusion detection and defense system 4.2 in one advantageous embodiment can additionally not only monitor but also control and/or filter the network traffic.

Downstream of the modem 6 in the direction of information flow, the mobile device 1 has an operating system 2. The operating system 2 can also comprise a firewall 5. On the mobile device 1, with the aid of the operating system 2, functionalities such as an OEM function 11.OEM and/or an end user function 11.EN can be carried out. An OEM function 11.OEM, for example, is a computer program product that records vehicle diagnosis data, processes it, if necessary, and sends it via one of the mobile connections to a vehicle manufacturer. An end user function 11.EN is, for example, a computer program product for providing a chat function. The end user function 11.EN is typically provided by software executed on separate hardware, such as a computer unit 13 of a vehicle or a mobile terminal of an end user.

The end user function 11.EN is located in the direction of information flow on the end user data path 10.EN upstream of a routing module 12 for specific selection of a path for transferring the network traffic.

When the intrusion detection system 4.1 or the intrusion detection and defense system 4.2 detect an attack on the mobile device 1, system behavior of the mobile device 1 or the operating system 2 is adapted in order to react to the attack. This reconfiguration is indicated in FIG. 1 by dashed arrows. For example, the logging of events and/or information can be initiated, a functionality of the mobile device 1 can be restricted or deactivated, in particular a functionality provided via a separate mobile connection, and/or a path selected for transferring the network traffic can be changed. Therefore, attributes and settings of the firewall 5, the SIM profile SIM1, SIM2 as well as of the OEM function 11.OEM can be adapted.

Furthermore, a computing unit 13 can be downstream of the mobile device 1. For example, this can be a personal computer, a control unit, a telematics unit of a vehicle, or similar. Similar to the mobile device 1, an OEM function 11.OEM and/or an end user function 11.EN can also be performed on the computing unit 13.

FIG. 2 shows an integration of such a mobile device 1 according to the invention, in the form of a telecommunication module 8 in a vehicle 9 according to the invention. Due to the provision of at least two SIM profiles SIM1, SIM2, the telecommunication module 8 is operated simultaneously ready for reception and transmission on both SIM profiles SIM1, SIM2. A plurality of SIM cards can be integrated into the mobile device 1 using a plurality of SIM slots, to provide the SIM profiles SIM1, SIM2. In general, a plurality of SIM profiles SIM1, SIM2 can also be provided on an individual SIM card and/or any storage device of the telecommunication module 8. The provision of at least one second SIM profile SIM2 enables the use of an end user SIM profile, in addition to an OEM SIM profile. An end user is thus able to provide a manipulated SIM profile in the telecommunication module 8. As a result, manipulated data packets can be introduced into the telecommunication module 8 and this, i.e., the vehicle 9, can be attacked. With the aid of a telecommunication module 8 designed as a mobile device 1 according to the invention, such attacks can however ever be detected and can be contained or prevented, as required. For this purpose, for example, a functionality of the mobile device 1 can be restricted or deactivated. Complete communication can also be ended via at least one of the mobile connections.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A mobile device comprising:

an operating system;

at least two SIM profiles configured to provide several independent mobile connections, wherein network traffic is exchanged via at least one mobile connection with a mobile network and information transmitted with the network traffic is identified; and an intrusion detection system or an intrusion detection and defense system configured to identify at least the information transmitted with the network traffic, wherein the intrusion detection system or the intrusion detection and defense system is arranged in a direction of the information flow of network traffic received from at least one mobile connection upstream of the operating system of the mobile device, wherein a deep packet inspection module is integrated into the intrusion detection system or the intrusion detection and defense system, and wherein the deep packet inspection module is configured to analyze decrypted data packets of the network traffic received from the at least one mobile connection prior to the operating system of the mobile device by checking headers and contents of the decrypted data packets.

2. The mobile device of claim 1, further comprising:

a firewall arranged downstream of the intrusion detection system or the intrusion detection and defense system in the direction of the information flow.

3. The mobile device of claim 1, wherein the intrusion detection system or the intrusion detection and defense system is configured to monitor, control, and filter the network traffic.

4. The mobile device of claim 1, wherein the intrusion detection system or the intrusion detection and defense system is integrated into a modem of the mobile device.

5. The mobile device of claim 1, wherein the mobile device is a mobile terminal or telecommunications module of a vehicle.

6. The mobile device of claim 1, wherein the intrusion detection system or the intrusion detection and defense system is further configured to:

detect a security threat for the mobile device; and responsive to the detection of the security threat reconfigure the operating system to adapt system behavior of the mobile device to the security threat, or restrict a functionality of at least one hardware or software component downstream of the mobile device in the direction of the information flow.

7. A method for operating a mobile device comprising an operating system and at least two SIM profiles configured to provide several independent mobile connections, the method comprising:

identifying, by an intrusion detection system or an intrusion detection and defense system of the mobile device, at least information transmitted with network traffic exchanged via at least one network connection with a mobile network, wherein one of the at least two SIM profiles is used for the at least one network connection, and wherein the intrusion detection system or the intrusion detection and defense system is arranged in a direction of the information flow of network traffic received from at least one mobile connection upstream of the operating system of the mobile device;

detecting, by the intrusion detection system or the intrusion detection and defense system, a security threat for the mobile device; and responsive to the detection of the security threat reconfiguring the operating system to adapt system behavior of the mobile device to the security threat, or restricting a functionality of at least one hardware or software component downstream of the mobile device in the direction of the information flow.

8. The method of claim 7, wherein the system behavior is adapted in such a way that the mobile device logs events or information, at least one functionality provided by the mobile device is restricted or deactivated, or a selected path for transferring the network traffic is changed.

9. The method of claim 7, wherein after detecting a security threat for the mobile device, a functionality of at least one mobile connection is restricted.

10. The method of claim 9, wherein network traffic exchanged via a first mobile connection is adjusted when the mobile device receives a trigger via a second mobile connection.

11. A vehicle, comprising:

a mobile device, which comprises an operating system;

at least two SIM profiles configured to provide several independent mobile connections, wherein network traffic is exchanged via at least one mobile connection with a mobile network and information transmitted with the network traffic is identified; and an intrusion detection system or an intrusion detection and defense system configured to identify at least the information transmitted with the network traffic, wherein the intrusion detection system or the intrusion detection and defense system is arranged in a direction of the information flow of network traffic received from at least one mobile connection upstream of the operating system of the mobile device, wherein a deep packet inspection module is integrated into the intrusion detection system or the intrusion detection and defense system, and wherein the deep packet inspection module is configured to analyze decrypted data packets of the network traffic received from the at least one mobile connection prior to the operating system of the mobile device by checking headers and contents of the decrypted data packets.

12. The vehicle of claim 11, wherein the intrusion detection system or the intrusion detection and defense system is further configured to:

detect a security threat for the mobile device; and responsive to the detection of the security threat reconfigure the operating system to adapt system behavior of the mobile device to the security threat, or restrict a functionality of at least one hardware or software component downstream of the mobile device in the direction of the information flow.

13. The vehicle of claim 11, wherein the mobile device further comprises:

a firewall arranged downstream of the intrusion detection system or the intrusion detection and defense system in the direction of the information flow.

14. The vehicle of claim 11, wherein the intrusion detection system or the intrusion detection and defense system is configured to monitor, control, and filter the network traffic.

15. The vehicle of claim 11, wherein the intrusion detection system or the intrusion detection and defense system is integrated into a modem of the mobile device.

16. The vehicle of claim 11, wherein the mobile device is a telecommunications module of the vehicle.

* * * * *